US011663597B2

(12) United States Patent
Ozdemir et al.

(10) Patent No.: US 11,663,597 B2
(45) Date of Patent: May 30, 2023

(54) SECURE E-COMMERCE PROTOCOL

(71) Applicant: ISTANBUL TEKNIK UNIVERSITESI, Istanbul (TR)

(72) Inventors: Enver Ozdemir, Istanbul (TR); Sena Efsun Cebeci, Istanbul (TR); Kubra Nari, Istanbul (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 126 days.

(21) Appl. No.: 17/174,397

(22) Filed: Feb. 12, 2021

(65) Prior Publication Data

US 2021/0272116 A1  Sep. 2, 2021

(30) Foreign Application Priority Data

Feb. 28, 2020 (TR) .................................. 2020/03100

(51) Int. Cl.
*G06Q 20/40* (2012.01)
*G06Q 20/38* (2012.01)
*G06Q 30/0601* (2023.01)

(52) U.S. Cl.
CPC ..... *G06Q 20/401* (2013.01); *G06Q 20/38215* (2013.01); *G06Q 30/0609* (2013.01); *G06Q 2220/00* (2013.01)

(58) Field of Classification Search
CPC .......... G06Q 20/401; G06Q 20/38215; G06Q 30/0609; G06Q 2220/00; G06Q 20/12; G06Q 20/383; G06Q 20/4016
See application file for complete search history.

(56) References Cited

U.S. PATENT DOCUMENTS

| 10,388,411 | B1* | 8/2019 | Dicks | H04L 67/565 |
| 2002/0091635 | A1* | 7/2002 | Dilip | G06Q 20/3821 |
| | | | | 705/39 |
| 2005/0050366 | A1 | 3/2005 | Kwok et al. | |
| 2009/0254440 | A1* | 10/2009 | Pharris | G06Q 20/204 |
| | | | | 705/40 |
| 2018/0189778 | A1* | 7/2018 | Grassadonia | G06Q 20/08 |

(Continued)

FOREIGN PATENT DOCUMENTS

| CN | 106600379 A | 4/2017 |
| CN | 108510353 A | 9/2018 |
| WO | 2018136494 A1 | 7/2018 |

OTHER PUBLICATIONS

Sena Efsun Cebeci, et al., Secure E-Commerce Scheme, IEEE Access, 2022, pp. 10359-10370, vol. 10.

*Primary Examiner* — Jacob C. Coppola
*Assistant Examiner* — Vincent I Idiake
(74) *Attorney, Agent, or Firm* — Bayramoglu Law Offices LLC

(57) ABSTRACT

An E-commerce protocol is provided. The E-commerce protocol has been developed as a solution to malicious attacks such as credit card fraud and stealing of various financial data, wherein the malicious attacks appeared particularly in a cyber world. With the help of the E-commerce protocol, a manipulated version of user information in an E-commerce database removes security risks of compromising on E-commerce systems. Even though a user does not have to share personal information of the user with E-commerce companies, an application also eliminates a necessity of entering the user information for each online transaction.

2 Claims, 2 Drawing Sheets

(56) References Cited

U.S. PATENT DOCUMENTS

| | | | |
|---|---|---|---|
| 2020/0027083 A1* | 1/2020 | Patrni | G06Q 20/40 |
| 2020/0104841 A1* | 4/2020 | Osborn | G06Q 20/3226 |
| 2021/0256484 A1* | 8/2021 | Kim | G06Q 20/204 |

* cited by examiner

SECURE E-COMMERCE PROTOCOL

CROSS REFERENCE TO THE RELATED APPLICATIONS

This application is based upon and claims priority to Turkish Patent Application No. 2020/03100, filed on Feb. 28, 2020, the disclosure of which is incorporated herein by reference in its entirety.

TECHNICAL FIELD

The invention is a new E-commerce protocol which has been developed against vulnerabilities in E-commerce systems. The digitizing trend in E-commerce system brings several security and privacy problems such as credit card fraud, stolen user accounts from E-commerce databases. The security bridges occur in general on the side of companies providing online shopping services for example credit card information of several users of TARGET has been stolen by hackers from TARGET database. The new protocol is designed to remove security concerns on the side of E-commerce companies. In other words, the protocol allows only manipulated version of users' data to be stored in an E-commerce database and such data does not have any meaning or information about the users unless certain shares from users' bank are combined. The protocol remedies concerns on security bridges on the side of E-commerce companies which eventually removes the need of costly investments to keep such companies' databases secure.

BACKGROUND

The number of people who have been using E-commerce systems has reached 1.61 billion in 2016 and it is declared that the amount of money spent on E-commerce has exceeded 1.9 trillion US dollars. At the end of the year 2020, the expected expenses in E-commerce to reach 4.06 trillion dollars. In light of this information, security problems that are appeared in E-commerce activities (particularly in areas such as credit card fraud, the hijacking of user accounts, and the storing of user information without encryption) are being frequently observed.

The international patent document numbered WO2018136494, in the state of the art, an E-commerce service that is based on user security, and a cryptogram that assures the transaction to be continued under the control of the user is described. This method enables the transaction to be confirmed with the "confirm" option and to be rejected by the "reject" option under the control of the user. Moreover, when necessary, a free of charge call center service is also provided. In this method, an electronic message (authorization request message) is sent to the user who has requested authorization for a transaction to be carried out. The authorization request message may additionally include a confirmation code.

In the Chinese patent document numbered CN108510353, in the state of the art an E-commerce platform having an online banking service together with a payment service module is addressed. The payment service module is supported by a security service module, an identification verification service module, an authorization service module, a management service module, an invoice management module, and a transaction service.

In the Chinese patent document numbered CN106600379, in the state of the art, it is disclosed that the payment in an E-commerce service platform is carried out under the guarantee of the security service module. The security service module, first of all, verifies the personal information of the user and then provides a customer identification management and verification service module service, an authorization service module and a security certificate management module for each user.

In the United States Patent document numbered US2005050366, in the state of the art, access to a web site via a smart card and a secure electronic commerce method are introduced. Before the user accesses the website, the user is authenticated with any or all of the combination of PIN, face image, eye image, voice, and fingerprint features. The encryption technique comprises an algorithm that has two main components and a key. The programs that have been written in Java language are independent of the platform and they include a systematic security. Additionally, an encryption embedded into the smart Java card, compares the PIN code entered by the user for identification, by combining it with a secure key and a security certificate.

When the state of the art methods were examined, the necessity of developing the protocol subject to the invention to overcome the problems that are emerged in E-commerce activities, such as credit card fraud, the stolen user accounts and the storing of user information with or without encryption by the E-commerce companies.

SUMMARY

The invention aims to develop an E-commerce protocol where the data of the users are not able to be reached (credit card information etc.) even when the database of the E-commerce site is compromised and where the personal data will be stored in an encrypted format or as plaintext.

Another aim of this invention is to establish an E-commerce protocol where the users will have control over their private data. In other words, the users do not have to share their information with E-commerce company which remedy the risk on E-commerce companies.

The invention provides an E-commerce protocol where the personal data of the users are manipulated with mathematical methods and send to E-commerce companies. Then the manipulated version of the data is stored in the E-commerce database.

BRIEF DESCRIPTION OF THE DRAWINGS

The E-commerce protocol developed to achieve the objectives of the invention has been represented in the attached figures.

According to these figures.

Figure 1:
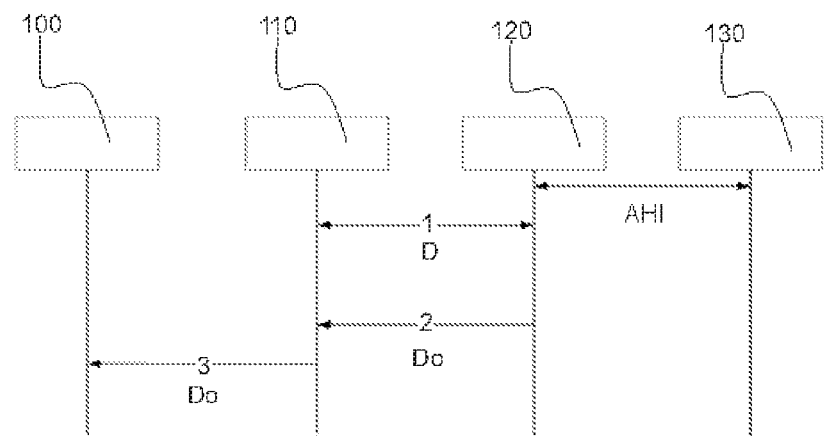
FIG. 1: The schematic view illustrates the initial registration and the first purchase of the user in the E-commerce system.

The parts in the figures have been numbered and their descriptions have been listed below.

100. E-commerce website
110. User
120. Bank
130. Credit card supplier EMV
A: Total payment amount in a single online transaction
C: Encrypted data
D: User information (Account number information, E-commerce company's certificate, birthdate, address etc.)

k: Symmetric encryption key which is used in a symmetric encryption algorithm $D_o$: Encrypted D under the symmetric encryption algorithm with symmetric key k $T_n$: An integer value randomly generated by the bank for each time frame F: Function established according to time and payment amount information uID: Unique number assigned to each user Modlo p (Mod p): Multi-digit prime numbers with respect to the modulo p i: Inverse of uID respect to mod (p−1)

C: Encrypted text C with calculated $i^{th}$ power

AHI: Account holder's information

DETAILED DESCRIPTION OF THE EMBODIMENTS

The invention, is an E-commerce protocol, including the following steps,

Generating the value $T_n$ by the bank and submission of this value to the user in a determined time frame, Combining the value $T_n$ with D which is the user's data (non-encrypted version) and E which is the E-commerce company's certificate values by the user, Generating the value $D_0$ by the bank via the application, Submitting the generated $D_0$ to the E-commerce company by the user and storing the value $D_0$ in the database of the E-commerce company, Generating the value T by the bank, and obtaining the value $T_n$=F(Time_frame, A), Transmitting the value A to the bank by the user-side application, Using the value A by the bank and calculating C with values $T_n$ and k in Formula II and sending the result to the user as in Formula II as follows:

$$C=(T_n kA)^{uID} \bmod p \quad \text{(Formula II)}$$

Submitting the value C to the E-commerce company by the user,

Submitting the E which is the certificate of the E-commerce company and the values C and $D_0$ to the bank, in order to complete the purchasing process, Receiving the value C by the bank and confirming the purchase by using $D_0$.

The invention is an E-commerce protocol that aims to provide data security of users and to establish a secure commerce between the user and the E-commerce company. The protocol can be adapted to all kinds of E-commerce systems and the companies will not be burdened with extra responsibility, on the contrary, the protocol provides a bank and user-oriented security solution.

In the operation principle of the protocol, there are two basic steps. These are as follows:

The initial registration of the user to the E-commerce system and the first purchase The process of the future purchase The Initial Registration of the User to the E-Commerce System and the First Purchase In the first step of the protocol, the registration process of the user to the E-commerce system is performed, where registration is carried out just once. At this step, the required user information (credit card number, date of birth, address etc.) and the certificate information of the E-commerce company are combined by the bank and the value D is obtained. The AHI (Account holder's information) is shared between the bank and the card supplier EMV (Europay Mastercard Visa). This process already exists when the user obtains his/her credit card. The card supplier EMV acts as the credit card center for card types such as Visa, Mastercard, and the card supplier EMV works together with the bank when the card verification process of the user is performed. The data D is encrypted using any of the symmetric key encryption methods (for example by a standard AES (Advanced Encryption Standard) algorithm) with a key k selected by the bank and the cipher is sent back to the user after being encrypted where the cipher is denoted by $D_0$.

$$E_k(D)=D_0 \quad \text{(Formula I)}$$

The value $D_0$ is sent securely, in order to be stored in the database of the E-commerce company during the connection which is established between the user and the E-commerce system. As a result, the registration step is completed. After the registration step is performed, the user does not have to enter the required payment information such as credit card information for future purchases. At this step, the user information can be revealed from the value $D_0$ that includes the data of the user in the E-commerce company only if the secret key k at the bank's system is known. As the certificate of the E-commerce company is embedded into the value $D_0$, the value $D_0$ will only be used by this company. (FIG. 1)

The Sequence of the Process Steps Indicated in FIG. 1:

It is assumed that the AHI is shared between the bank and the card supplier EMV at a time frame before the initiation of the registration step.

1. Sharing of the user data D between the user and the bank,
2. Extracting of the value $D_0$ from D by the bank, using the symmetric key k, and sending the encrypted data $D_0$ to the user,
3. Submission of the encrypted data $D_0$ to the E-commerce website by the user.

Process of the Future Purchase

As the second step of the protocol, the online shopping scenario of the user's $n^{th}$ purchase is described. At this step, when the user reaches the related payment step on the E-commerce website, the user shares the payment amount value denoted by A with the bank and the credit card supplier EMV. The bank determines a value $T_n$ depending on the time of the transaction and this determined value T is valid through the specific time frame that is also determined by the bank. The value $T_n$ is an integer value randomly generated by the bank for each time frame and this value is the same for all users that are processing a transaction at that time frame. The values A and $T_n$ are subjected to a modulo operation by including the secret key k of the bank. The bank conceals the values A and $T_n$ by selecting a group where the discrete logarithm problem is hard. As an example, a multiplicative group according to the modulo p (mod p) where the prime integer p is determined by the bank can be used within the scope of the invention. This value p is a multi-digit prime number determined by the bank. The values $T_n$, k and A are concealed by applying the formula below and as a result, an encrypted data C is obtained from these values.

$$C=(T_n kA)^{uID} \bmod p \quad \text{(Formula II)}$$

The value uID used here is the unique user identification number that belongs to the user (such as the user account number etc.).

Figure 2:
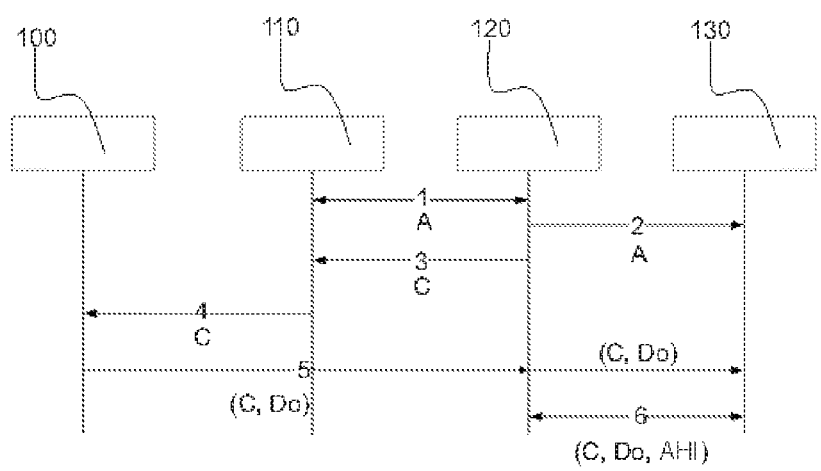
FIG. 2: The schematic view of the processes regarding future purchases carried out on the E-commerce protocol subject to the invention.

The encrypted data C is transmitted to the user at the end of the process. The user submits the value C to the E-commerce website and the E-commerce website simultaneously sends the value C together with the information $D_0$ to the bank and the credit card supplier EMV. In order to process the user verification and purchasing, the information C, $D_0$ and AHI must be controlled between the bank and the credit card supplier EMV. (FIG. 2)

To check if the transaction is valid and to confirm the money transfer, the bank must check the value $T_n$ that it has selected during the transaction. For the control:

The value i is the inverse of W/D and it is calculated according to the formula below.

$$uID \cdot i \equiv 1 \bmod(p-1) \quad \text{(Formula III)}$$

Then, $$C^i = ((T_n \cdot k \cdot A)^{uID}) = (T_n \cdot k \cdot A)^{uID \cdot i} = T_n \cdot k \cdot A \bmod p \quad \text{(Formula IV)}$$

At the end of the process, the values $T_n$ and A are compared with the information in the bank. Thus, the money transfer process is confirmed.

The Sequence of the Process Steps Indicated in FIG. 2:
1. Sharing the payment amount A between the user and the bank,
2. Transmitting the value A to the credit card supplier EMV,
3. Generating the encrypted data C by the bank and submitting it to the user,
4. Sending the value C to the E-commerce website by the user,
5. Submitting the values C and $D_0$ by the E-commerce website simultaneously, to the bank and credit card provider EMV,
6. Sharing the values C, $D_0$ and AHI to perform purchasing and verification processes between the bank and the credit card supplier EMV.

What is claimed is:

1. An E-commerce method for an E-commerce transaction, comprising the following steps:
  combining, by a user device, non-encrypted data of the user device and an E-commerce company certificate into a value D;
  receiving, by a bank, the value D from the user device and encrypting the value D using a symmetric key to generate, by the bank, an encrypted value Do and providing by the bank the encrypted value Do to the user device;
  submitting, by the user device and electronically via the internet, the encrypted value Do to an E-commerce company and storing the encrypted value Do in a database of the E-commerce company;
  generating, by the bank, a first value $T_n$ wherein the first value $T_n$ is obtained by:
  $T_n$=F(Time_frame), wherein Time_frame is a time frame in which the E-commerce transaction is processed;
  transmitting, by an application in the user device, a first value A to the bank, wherein the first value A is a total payment amount of the E-commerce transaction between the user device and the E-commerce company;
  calculating, by the bank and according to the first value A, a value C with the first value $T_n$, and a secret key k in a formula and sending the value C to the user device, wherein the formula is expressed as:
  C=$(T_n kA)^{UID}$ mod p, wherein UID is a user identification number, and p is a multi-digit prime number determined by the bank;
  submitting, by the user device and electronically via the internet, the value C to the E-Commerce company;
  submitting, by the E-commerce company, the encrypted value Do and the value C, simultaneously to the bank in order to complete the E-commerce transaction; and
  receiving the value C and the encrypted value Do by the bank from the E-commerce company;
  generating, by the bank, a second value $T_n$ and a second value A based on the value C received from the E-Commerce company;
  confirming, by the bank to the E-Commerce company, the E-Commerce transaction by using the encrypted value Do and comparing and determining that the second value $T_n$ matches the first value $T_n$ and the second value A matches the first value A.

2. An E-commerce system for an E-commerce transaction, comprising: a user device, a bank, and an E-commerce company; wherein the E-commerce system completes and confirms the E-commerce transaction by:
  combining, by a user device, non-encrypted data of the user device and an E-commerce company certificate into a value D;
  receiving, by a bank, the value D from the user device and encrypting the value D using a symmetric key to generate, by the bank, an encrypted value Do and providing by the bank the encrypted value Do to the user device;
  submitting, by the user device and electronically via the internet, the encrypted value Do to an E-commerce company and storing the encrypted value Do in a database of the E-commerce company;
  generating, by the bank, a first value $T_n$ wherein the first value $T_n$ is obtained by:
  $T_n$=F(Time_frame), wherein Time_frame is a time frame in which the E-commerce transaction is processed;
  transmitting, by an application in the user device, a first value A to the bank, wherein the first value A is a total payment amount of the E-commerce transaction between the user device and the E-commerce company;
  calculating, by the bank and according to the first value A, a value C with the first value $T_n$, and a secret key k in a formula and sending the value C to the user device, wherein the formula is expressed as:
  C=$(T_n kA)^{UID}$ mod p, wherein UID is a user identification number, and p is a multi-digit prime number determined by the bank;
  submitting, by the user device and electronically via the internet, the value C to the E-Commerce company;
  submitting, by the E-commerce company, the encrypted value Do and the value C, simultaneously to the bank in order to complete the E-commerce transaction; and
  receiving the value C and the encrypted value Do by the bank from the E-commerce company;
  generating, by the bank, a second value $T_n$ and a second value A based on the value C received from the E-Commerce company;
  confirming, by the bank to the E-Commerce company, the E-Commerce transaction by using the encrypted value Do and comparing and determining that the second value $T_n$ matches the first value $T_n$ and the second value A matches the first value A.

* * * * *